(12) United States Patent
Ryu et al.

(10) Patent No.: US 12,210,090 B2
(45) Date of Patent: Jan. 28, 2025

(54) POSITION-MEASURING DEVICE USING UWB ANTENNA

(71) Applicant: AMOSENSE CO., LTD, Cheonan-si (KR)

(72) Inventors: Kyunghyun Ryu, Seoul (KR); Haewoon Cheon, Seoul (KR); Jaeil Park, Hwaseong-si (KR); Hyungil Baek, Yongin-si (KR); Seongjae Ahn, Suwon-si (KR); Jeonggeun Heo, Seoul (KR); Seho Lee, Seoul (KR); Chanwoo Lee, Yongin-si (KR)

(73) Assignee: AMOSENSE CO., LTD, Cheonan-si (KR)

( * ) Notice: Subject to any disclaimer, the term of this patent is extended or adjusted under 35 U.S.C. 154(b) by 511 days.

(21) Appl. No.: 17/634,987

(22) PCT Filed: Aug. 6, 2020

(86) PCT No.: PCT/KR2020/010443
§ 371 (c)(1),
(2) Date: Feb. 13, 2022

(87) PCT Pub. No.: WO2021/029617
PCT Pub. Date: Feb. 18, 2021

(65) Prior Publication Data
US 2022/0291374 A1 Sep. 15, 2022

(30) Foreign Application Priority Data

Aug. 13, 2019 (KR) .................. 10-2019-0098947

(51) Int. Cl.
*G01S 13/87* (2006.01)
*G01S 7/03* (2006.01)
(Continued)

(52) U.S. Cl.
CPC .............. *G01S 13/878* (2013.01); *G01S 7/03* (2013.01); *H01Q 5/25* (2015.01); *H01Q 23/00* (2013.01)

(58) Field of Classification Search
CPC .......... G01S 13/878; G01S 7/03; H01Q 5/25; H01Q 23/00
(Continued)

(56) References Cited

U.S. PATENT DOCUMENTS 7,133,646 B1  11/2006  Miao
8,374,260 B2   2/2013  Schirmacher et al.
(Continued)

FOREIGN PATENT DOCUMENTS

KR   10-2009-0075078 A    7/2009
KR       2009075078 A  *  7/2009
(Continued)

OTHER PUBLICATIONS

Machine translation of KR-2009075078-A (Year: 2008).*
KR Office Action dated Sep. 10, 2024 in application 1020190098947.

*Primary Examiner* — Kam Wan Ma
(74) *Attorney, Agent, or Firm* — Maschoff Brennan (57) ABSTRACT

Presented is a position-measuring device using UWB antenna, the position-measuring device distinguishing measurement targets positioned indoors from measurement targets positioned outdoors on the basis of UWB signals received from a plurality of UWB antennas. The presented position-measuring device includes: a first UWB antenna; a second UWB antenna; a third UWB antenna; a signal processing module which outputs a signal received from the first UWB antenna and a UWB signal received from at least one among the second UWB antenna and the third UWB antenna; and a position-measuring module which measures
(Continued)

the position of the measurement target on the basis of the UWB signals output from the signal processing module.

8 Claims, 7 Drawing Sheets

(51) Int. Cl.
*H01Q 5/25* (2015.01)
*H01Q 23/00* (2006.01)
(58) Field of Classification Search
USPC .......................................................... 340/933
See application file for complete search history.

(56) References Cited

U.S. PATENT DOCUMENTS

| 8,964,914 | B2 | 2/2015 | Avivi et al. |
| 2005/0170778 | A1 | 8/2005 | Uchiyama et al. |
| 2018/0188349 | A1* | 7/2018 | Lee .......................... G01S 5/06 |
| 2021/0302967 | A1* | 9/2021 | Ko .......................... G05D 1/223 |

FOREIGN PATENT DOCUMENTS

| KR | 20100137390 A | 12/2010 | |
| KR | 10-2011-0085204 A | 7/2011 | |
| KR | 20140043942 A | 4/2014 | |
| KR | 10-1902715 B | 12/2017 | |
| WO | 2009-145325 A | 12/2009 | |
| WO | WO-2009145325 A1 * | 12/2009 | ............. G01S 13/74 |

* cited by examiner

POSITION-MEASURING DEVICE USING UWB ANTENNA

TECHNICAL FIELD

The present disclosure relates to a UWB antenna module for receiving an Ultra-Wide Band (UWB) signal, and a position-measuring device for measuring a position of a measurement target using a signal received from the UWB antenna module.

BACKGROUND ART

As various communication technologies have recently been developed, a vehicle provides various convenience functions to a driver by reflecting position information. In other words, the vehicle measures position information such as a distance between the driver and the vehicle, the driver's position, and the vehicle position through communication, and provides various convenience functions to the driver using the measured position information.

For example, the vehicle provides a function of guiding the driver a path to a parked vehicle using the driver's position and the vehicle position or a function of opening a vehicle door when the driver approaches the vehicle and locking the vehicle door when the driver moves away from the vehicle using the distance between the driver and the vehicle.

A conventional vehicle has used low frequency (LF) or radio frequency (RF) communication to measure the driver and the position information.

Recently, a technology of measuring the position information using the ultra-wide band (UWB) communication has been developed and applied in various fields, and research is being conducted to apply the position-measuring technology using the UWB communication to the vehicle.

The UWB communication can provide the wireless positioning and the communication function with high precision through an impulse signal. The UWB communication uses a frequency band of about 3.1 GHz to 10.6 GHz and has a transmission distance of about 10 m to 1 km. The UWB communication has the excellent time resolution of several nsec pulses, and therefore, is advantageous for measuring the distance, and can implement low power due to a low duty cycle. Therefore, the UWB communication is being applied to a position-measuring field requiring a low-speed position recognition-based application service and a position-measuring field having the precision of about +/−10 cm.

However, the UWB communication has a problem in that the position information cannot be measured under specific conditions because antenna performance varies greatly depending on the directionality of the UWB antenna module and the surrounding environments. In other words, the UWB antenna module has a problem in that positioning errors and deviations occur due to the signal loss and the multipath fading caused by the influence of vehicle metal parts or a human body in a specific direction.

For example, there is a problem in that if the UWB antenna module is positioned in a person's back pocket with a keyfob installed, or when another vehicle exists between the person and the vehicle, the signal loss and the multipath fading occur due to the influence of the vehicle metal parts or the human body in the specific direction, thereby causing the errors or the deviations in the position information measured through the UWB communication.

SUMMARY OF INVENTION

Technical Problem

The present disclosure is proposed in consideration of the circumstances, and an object of the present disclosure is to provide a position-measuring device using a UWB antenna, which distinguishes measurement targets positioned indoors from measurement targets positioned outdoors based on UWB signals received from a plurality of UWB antennas.

In addition, another object of the present disclosure is to provide a position-measuring device using a UWB antenna, which measures a position of a measurement target using signals received from some of a plurality of UWB antennas based on the position of the measurement target.

Solution to Problem

To achieve the objects, a position-measuring device using a UWB antenna according to an exemplary embodiment of the present disclosure includes: a first UWB antenna configured to transmit or receive a UWB tag positioned on a measurement target and a UWB signal, a second UWB antenna configured to receive a UWB signal output from the UWB tag, a third UWB antenna configured to receive the UWB signal output from the UWB tag, a signal processing module configured to output the signal received from the first UWB antenna and the UWB signal received from at least one of the second UWB antenna and the third UWB antenna, and a position-measuring module configured to measure a position of the measurement target based on the UWB signals output from the signal processing module.

The position-measuring module can include: a transmission terminal, a first reception terminal, and a second reception terminal, and the signal processing module can include: a first switch configured to switch the first UWB antenna to one of the transmission terminal and the second reception terminal in response to a control signal of the position-measuring module to form one path of a transmission path and a reception path between the first UWB antenna and the position-measuring module. At this time, when receiving a transmission signal from the position-measuring module, the first switch can be switched to the transmission terminal to form the transmission path between the first UWB antenna and the position-measuring module, and when receiving a reception signal from the position-measuring module, the first switch can be switched to the second reception terminal to form the reception path between the first UWB antenna and the position-measuring module.

The signal processing module can further include: a coupler configured to combine the UWB signal received from the second UWB antenna and the UWB signal received from the third UWB antenna to generate a combined UWB signal and to transmit the combined UWB signal to the first reception terminal or a second switch configured to switch the first reception terminal to one of the second UWB antenna and the third UWB antenna in response to the control signal of the position-measuring module.

The signal processing module can include: a power amplifier configured to amplify the UWB signal output from the position-measuring module, a first low-noise amplifier configured to amplify the UWB signal received from the first UWB antenna, a first switch configured to switch the first UWB antenna to one of the power amplifier and the first low-noise amplifier in response to the control signal of the position-measuring module, and a third switch configured to switch the first low-noise amplifier to the second reception terminal of the position-measuring module in response to the control signal of the position-measuring module and to switch the power amplifier to the transmission terminal of the position-measuring module. The signal processing module can further include: a second low-noise amplifier configured to amplify the UWB signal received from one of the second UWB antenna and the third UWB antenna to transmit it to the second reception terminal of the position-measuring module, and a second switch configured to switch one of the second UWB antenna and the third UWB antenna to the second low-noise amplifier in response to the control signal of the position-measuring module.

Advantageous Effects of Invention

According to the present disclosure, the position-measuring device using the UWB antenna can distinguish an indoor measurement target from an outdoor measurement target and measure a position of the measurement target using some of the plurality of UWB antennas depending upon the position of the measurement target, thereby accurately measuring not only the position of the measurement target positioned in the outdoor but also the position of the measurement target positioned indoor.

In addition, the position-measuring device using the UWB antenna can combine the signals received from the plurality of UWB antennas through the combiner, thereby outputting the UWB signal with the increased gain.

In addition, the position-measuring device using the UWB antenna can measure the position of the measurement target using the UWB signal with the increased gain, thereby extracting the accurate positioning data compared to the switching method.

In addition, the position-measuring device using the UWB antenna can be disposed to be spaced apart from a heterogeneous or homogeneous UWB antenna, thereby improving the accuracy of the positioning data compared to the conventional UWB positioning technology.

DESCRIPTION OF EMBODIMENTS

Hereinafter, to specifically explain the present disclosure so that those skilled in the art to which the present disclosure pertains can easily carry out the technical spirit of the present disclosure, the most preferred exemplary embodiments of the present disclosure will be described with reference to the accompanying drawings. First, in adding the reference numerals to components of each drawing, it should be noted that the same components are denoted by the same reference numerals as possible even when being shown in different drawings. In addition, in describing the present disclosure, if it is determined that a detailed description of the related known configuration or function can obscure the gist of the present disclosure, a detailed description thereof will be omitted.

Figure 1:
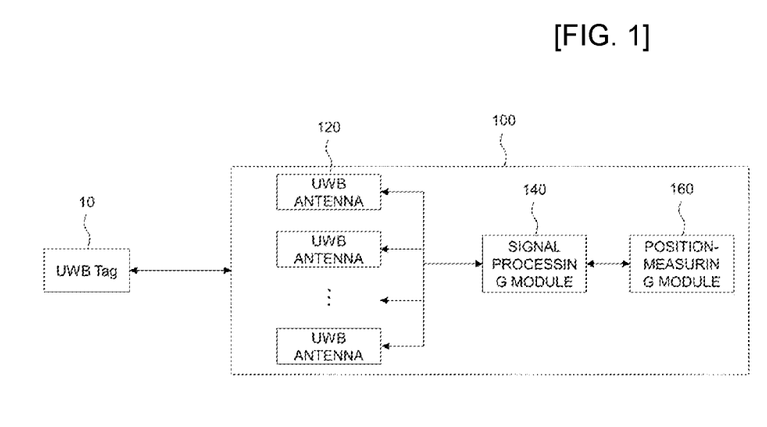
FIG. 1 is a diagram for explaining a position-measuring device using a UWB antenna according to an exemplary embodiment of the present disclosure.

Referring to FIG. 1, a position-measuring device 100 using a UWB antenna 120 according to an exemplary embodiment of the present disclosure (hereinafter, position-measuring device) is configured to include a plurality of UWB antennas 120, a signal processing module 140, and a position-measuring module 160.

For the position-measuring device 100, the characteristics of a group delay and a fidelity factor (frequency ratio between an output signal and an input signal) of a signal upon positioning are important. Therefore, the position-measuring device 100 has a plurality of UWB antennas 120 disposed therein to prevent a signal from being delayed. At this time, the plurality of UWB antennas 120 can be disposed to be parallel to each other, also be disposed vertically, or configured to have non-directionality and directionality in combination or alone. If the plurality of UWB antennas 120 are configured in directionality, some can be disposed to be directed toward indoor and the others can be disposed to be directed toward outdoor.

The plurality of UWB antennas 120 can be in the form of an LDA, a chip antenna, an FPCB, or an antenna in package (AiP). At this time, the plurality of UWB antennas 120 can be configured in the form of the same antenna or configured in the form of the heterogeneous antenna depending upon environments and characteristics.

The plurality of UWB antennas 120 are distributed and disposed to receive UWB signals UWB tag 10. The signal processing module 140 switches or combines some of the UWB signals received from the plurality of UWB antennas 120 to transmit them to the position-measuring module 160. The position-measuring module 160 measures a position of the measurement target (i.e., UWB tag 10) using the UWB signals switched or combined by the signal processing module 140. To this end, the signal processing module 140 can be configured to include a switch, a combiner, etc.

Figure 2:
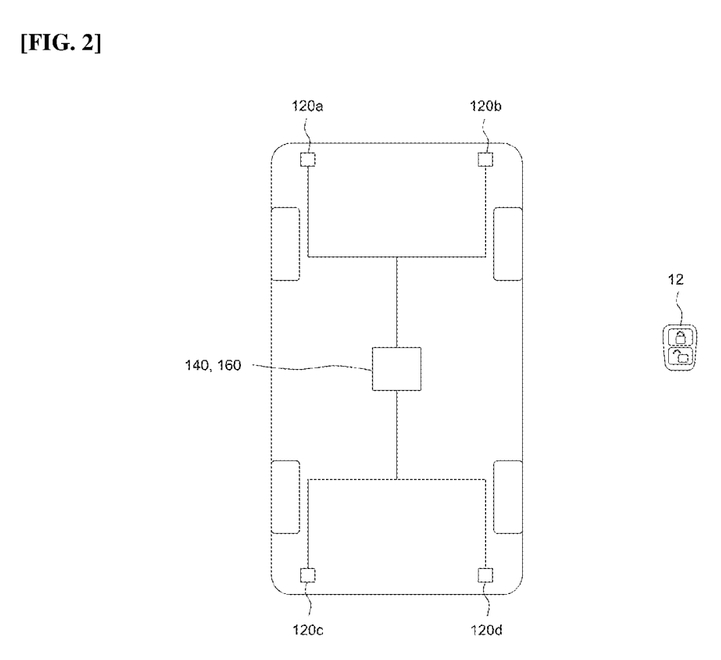
FIGS. 2 and 3 are diagrams for explaining an example in which a plurality of UWB antennas are disposed in the position-measuring device using the UWB antenna according to the exemplary embodiment of the present disclosure.
Figure 3:
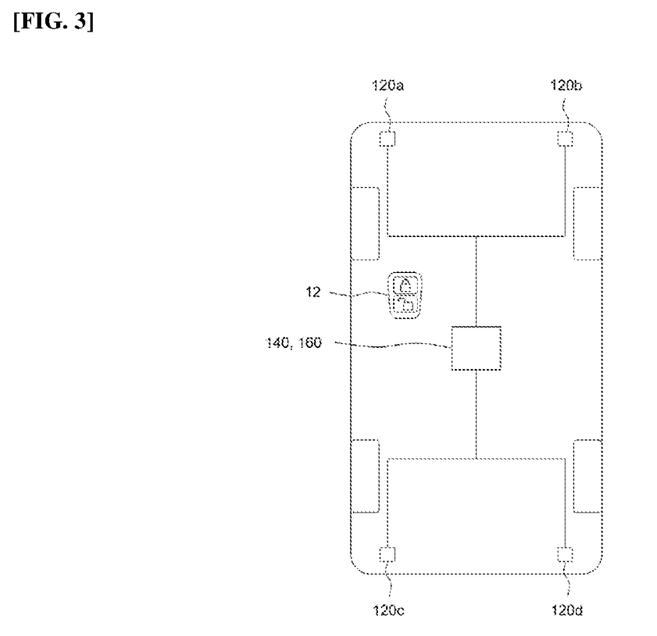

For example, referring to FIGS. 2 and 3, the signal processing module 140 is installed in a vehicle to measure the position of the measurement target outside the vehicle. The position-measuring device 100 is connected to a plurality of UWB antennas 120a to 120d installed in the vehicle and measures the position of the measurement target based on the UWB signals received from the plurality of UWB antennas 120a to 120d.

The position-measuring device 100 measures a position of a driver that is the measurement target through the UWB communication with a keyfob 12 corresponding to the vehicle. At this time, the position-measuring device 100 operates as a UWB anchor, measures a position of the keyfob 12 in communication with the keyfob 12 operating as the UWB tag 10, and sets the measured position of the keyfob 12 as the position of the measurement target.

As another example, the position-measuring device 100 is installed on a door lock, and measures a position of a person who is the measurement target positioned indoor or outdoor through the UWB communication with a smart key. At this time, the position-measuring device 100 measures the position of the smart key, and sets the measured position of the smart key as the position of the person who is the measurement target.

Hereinafter, to easily describe the exemplary embodiment of the present disclosure, the case where the position-measuring device 100 is installed in the vehicle has been described as an example, but the position-measuring device 100 is not limited thereto and can also be applied to a building with the door lock installed thereon, etc.

In addition, according to the exemplary embodiment of the present disclosure, to easily describe the present disclosure, it has been described that the position-measuring device 100 includes, for example, a first UWB antenna 121, a second UWB antenna 122, and a third UWB antenna 123, but the position-measuring device 100 is not limited thereto and can also be configured to include four or more UWB antennas 120.

Figure 4:
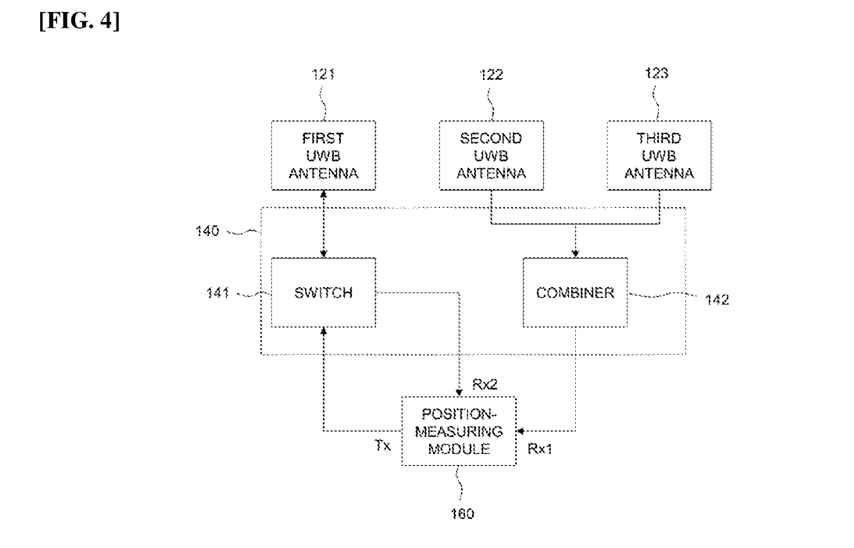
FIG. 4 is a diagram for explaining a configuration of a position-measuring device using a UWB antenna according to a first exemplary embodiment of the present disclosure.

Referring to FIG. 4, the position-measuring device 100 according to a first exemplary embodiment of the present disclosure is configured to include the first UWB antenna 121, the second UWB antenna 122, the third UWB antenna 123, a switch 141, a coupler 142, and the position-measuring module 160. Here, the switch 141 and the coupler 142 are included in the signal processing module 140 of FIG. 1.

The first UWB antenna 121 operates as one a transmission antenna and a reception antenna according to an operation of the switch 141. The first UWB antenna 121 transmits the UWB signal received from the position-measuring module 160 to the UWB tag 10 through the switch 141 when operating as the transmission antenna. The first UWB antenna 121 receives the UWB signal output from the UWB tag 10 when operating as the reception antenna and transmits the received UWB signal to the position-measuring module 160 through the switch 141.

The second UWB antenna 122 and the third UWB antenna 123 operate as the reception antenna. The second UWB antenna 122 and the third UWB antenna 123 receive the UWB signal output from the UWB tag 10 to transmit it to the coupler 142. At this time, the second UWB antenna 122 and the third UWB antenna 123 can receive the same UWB signal from the UWB tag 10 or receive UWB signals having different frequencies.

Figure 5:
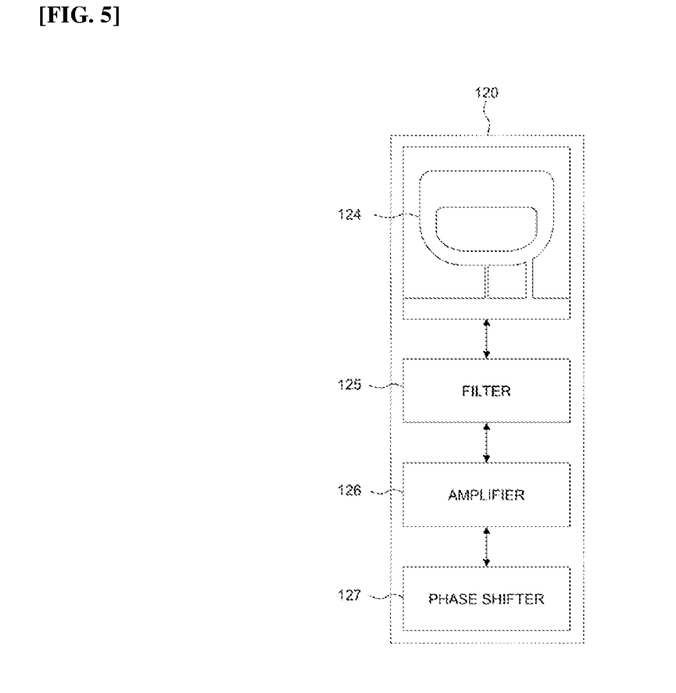
FIGS. 5 to 7 are diagrams for explaining the UWB antenna of FIG. 4.

Referring to FIG. 5, the first UWB antenna 121, the second UWB antenna 122, and the third UWB antenna 123 can be configured to include a radiation pattern 124, a filter 125, a low-noise amplifier (LNA) 126, and a phase shifter 127.

An antenna diversity can be classified into a space diversity method, a frequency diversity method, a time diversity method, and a polarization diversity method.

Figure 6:
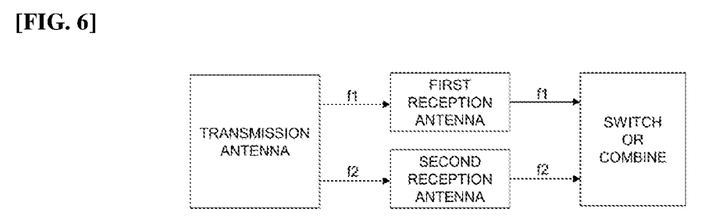

Referring to FIG. 6, the space diversity method is a method using two or more antennas divided spatially.

The space diversity method is a method for improving the fading effect by installing two or more antennas on positions with less fading correlation to be spaced apart from each other to select and receive the best signal.

The frequency diversity method is a method using a varying fading state of a receiving electric field when the frequencies are different. The frequency diversity method is a method using a smaller fading correlation as a frequency interval increases in two or more frequencies.

The time diversity method is implemented by a method for repeatedly sending the same information at a time interval, etc. The time diversity method uses interleaving, etc. to prevent a burst error that occurs intensively a certain period of time.

Figure 7:
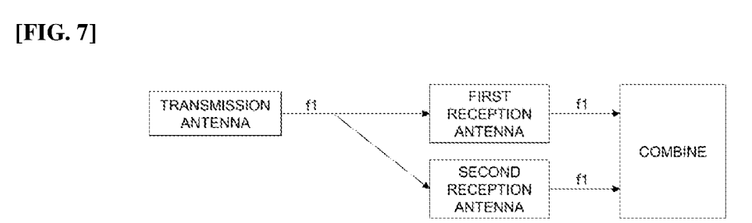

Referring to FIG. 7, the polarization diversity method is a method using the varying fading state when polarizations are different. The polarization diversity method separately transmits and receives two polarizations (vertical polarization, horizontal polarization), thereby improving the fading effect.

The position-measuring device 100 according to the exemplary embodiment of the present disclosure includes the plurality of UWB antennas 120 operated in one method selected from the aforementioned diversity antennas methods.

The switch 141 performs a switching operation in response to a control signal of the position-measuring module 160. The switch 141 receives, as the control signal, one of a transmission signal and a reception signal from the position-measuring module 160. The switch 141 forms a transmission path or a reception path between the first UWB antenna 121 and the position-measuring module 160 in response to the control signal of the position-measuring module 160.

When receiving the transmission signal, the switch 141 is switched to a transmission terminal (Tx) of the position-measuring module 160 to form the transmission path between the first UWB antenna 121 and the position-measuring module 160. When receiving the reception signal, the switch 141 is switched to a second reception terminal (Rx2) of the position-measuring module 160 to form the reception path between the first UWB antenna 121 and the position-measuring module 160.

The coupler 142 receives the UWB signals from the second UWB antenna 122 and the third UWB antenna 123. The coupler 142 combines the received UWB signals to generate a combined UWB signal and transmits the generated combined UWB signal to the position-measuring module 160. At this time, the coupler 142 is connected to a first reception terminal (Rx1) of the position-measuring module 160 and transmits the combined UWB signal to the position-measuring module 160 through the first reception terminal (Rx1).

The coupler 142 combines the UWB signals received from the plurality of UWB antennas 120 (e.g., the second UWB antenna 122 and the third UWB antenna 123). The coupler 142 combines the plurality of UWB signals using one of an equal gain combining method and a maximum ratio combining method.

The equal gain combining method is a method using a combing circuit with the fixed phase to sum all of the respective UWB signals. The maximum ratio combining method is a method for overlapping a number of input UWB signals to obtain optimal performance and taking synchronization before combining them.

Figure 8:
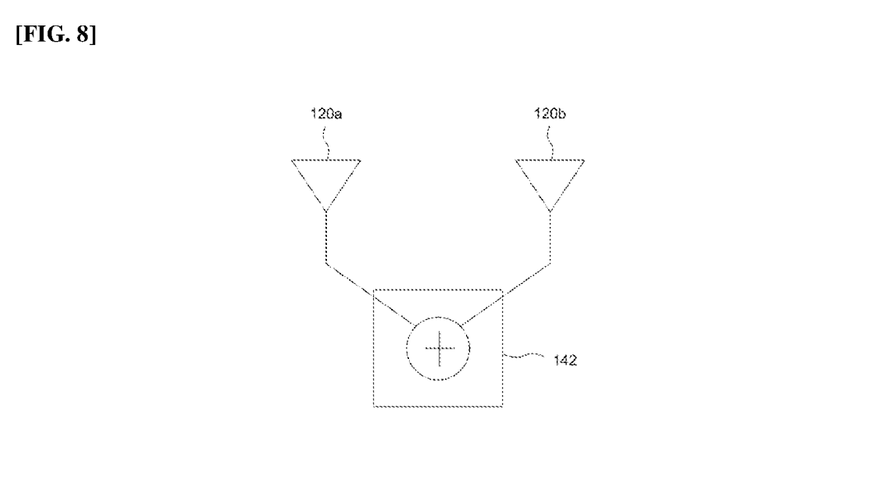
FIG. 8 is a diagram for explaining a coupler of FIG. 4.

Referring to FIG. 8, the equal gain combining method and the maximum ratio combining method are composed of two antennas and one coupler 142 (i.e., combiner), and therefore, the combiner combines the signals received from two UWB antennas 120a, 120b.

The position-measuring device 100 according to the first exemplary embodiment of the present disclosure combines and receives the signals in the equal gain combining method and the maximum ratio combining method using the plurality of UWB antennas 120 and the coupler 142.

According to the first exemplary embodiment of the present disclosure, it has been described that the second UWB antenna 122 and the third UWB antenna 123 are connected to the coupler 142 as an example, but the present disclosure is not limited thereto and three or more UWB antennas 120 can also be connected to the coupler 142. At this time, the positions and directions of the UWB antennas 120 connected to the coupler 142 are disposed at optimal positions in consideration of the neighboring environment between the UWB tag 10 and the position-measuring device 100 (i.e., UWB anchor).

The position-measuring module 160 controls the switch 141 for setting a mode of the first UWB antenna 121. In other words, the position-measuring module 160 transmits to the switch 141 a control signal for operating the first UWB antenna 121 in a transmission mode or a reception mode. At this time, the position-measuring module 160 uses, as the control signal, and transmits one of the transmission signal and the reception signal to the switch 141. Therefore, when receiving the transmission signal, the switch 141 is switched to the transmission terminal (Tx) of the position-measuring module 160 to form the transmission path between the first UWB antenna 121 and the position-measuring module 160, and when receiving the reception signal, is switched to the second reception terminal (Rx2) of the position-measuring module 160 to form the reception path between the first UWB antenna 121 and the position-measuring module 160.

The position-measuring module 160 measures the position of the measurement target based on the UWB signal received from the first UWB antenna 121 and the combined UWB signal received from the coupler 142. The position-measuring module 160 is configured to include a UWB chipset, and measures the position of the measurement target using the method for measuring the position using the signal such as a two way ranging (TWR) or an angle of arrival (AOA) alone or in parallel.

Figure 9:
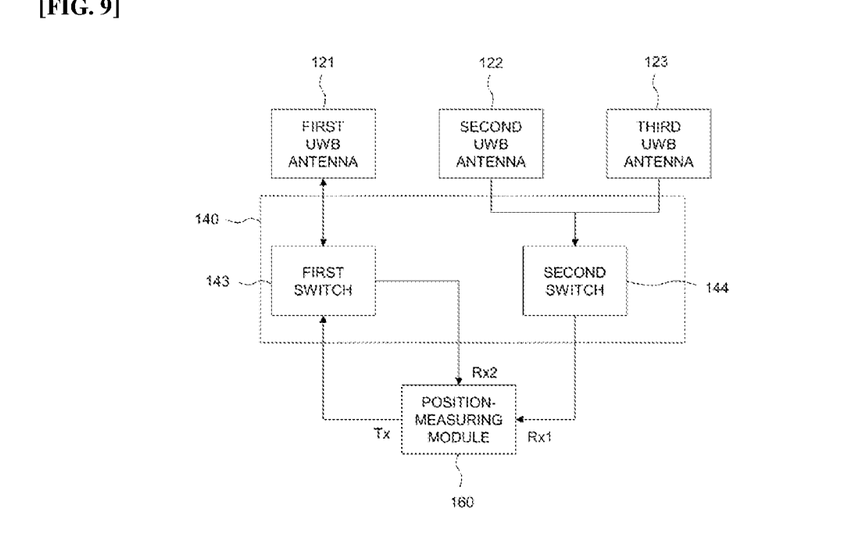
FIG. 9 is a diagram for explaining a configuration of a position-measuring device using a UWB antenna according to a second exemplary embodiment of the present disclosure.

Referring to FIG. 9, the position-measuring device 100 according to the second exemplary embodiment of the present disclosure is configured to include the first UWB antenna 121, the second UWB antenna 122, the third UWB antenna 123, a first switch 143, a second switch 144, and the position-measuring module 160.

The first UWB antenna 121 operates as one of the transmission antenna and the reception antenna according to the operation of the first switch 143. The first UWB antenna 121 transmits the UWB signal received from the position-measuring module 160 to the UWB tag 10 through the first switch 143 when operating as the transmission antenna. The first UWB antenna 121 receives the UWB signal output from the UWB tag 10 when operating as the reception antenna and transmits the received UWB signal to the position-measuring module 160 through the first switch 143.

The second UWB antenna 122 and the third UWB antenna 123 operate as the reception antenna. The second UWB antenna 122 and the third UWB antenna 123 receive the UWB signal output from the UWB tag 10 to transmit it to the second switch 144. At this time, the second UWB antenna 122 and the third UWB antenna 123 can receive the same UWB signal from the UWB tag 10 or receive UWB signals having different frequencies.

The first switch 143 performs the switch operation in response to the control signal of the position-measuring module 160. The first switch 143 receives, as the control signal, one of the transmission signal and the reception signal from the position-measuring module 160. The first switch 143 forms the transmission path or the reception path between the first UWB antenna 121 and the position-measuring module 160 in response to the control signal of the position-measuring module 160.

When receiving the transmission signal, the first switch 143 is switched to the transmission terminal (Tx) of the position-measuring module 160 to form the transmission path between the first UWB antenna 121 and the position-measuring module 160. When receiving the reception signal, the first switch 143 is switched to the second reception terminal (Rx2) of the position-measuring module 160 to form the reception path between the first UWB antenna 121 and the position-measuring module 160.

The second switch 144 transmits one of the plurality of UWB signals to the position-measuring module 160 using one of an antenna switching method and a selective combining method. The antenna switching method is a method for receiving the UWB signal by switching the antenna to an antenna with a good reception state among the plurality of UWB antennas 120. The selective combining method is a method for selecting the best signal by comparing all received different UWB signals at any given time. To this end, the antenna switching method and the selective combining method are composed of two antennas and one switch (i.e., the second switch 144) to switch (change) the switch to one of two antennas depending upon the signal state, and to receive the signal through the switched antenna.

The second switch 144 is switched to one of the second UWB antenna 122 and the third UWB antenna 123 in response to the control signal of the position-measuring module 160. The second switch 144 receives one of a first selection signal and a second selection signal as the control signal. The second switch 144 forms the reception path between one of the second UWB antenna 122 and the third UWB antenna 123 and the position-measuring module 160 in response to the control signal of the position-measuring module 160.

When receiving the first selection signal, the second switch 144 is switched to the second UWB antenna 122 to form the reception path between the second UWB antenna 122 and the second reception terminal (Rx2) of the position-measuring module 160. When receiving the second selection signal, the second switch 144 forms the reception path between the third UWB antenna 123 and the second reception terminal (Rx2) of the position-measuring module 160. The second switch 144 transmits the UWB signal received from the second UWB antenna 122 or the third UWB antenna 123 to the second reception terminal (Rx2) of the position-measuring module 160 through the reception path formed by the switching operation.

The position-measuring module 160 controls the first switch 143 to set the mode of the first UWB antenna 121. In other words, the position-measuring module 160 transmits the control signal for operating the first UWB antenna 121 in the transmission mode or the reception mode to the first switch 143. At this time, the position-measuring module 160 uses, as the control signal, and transmits one the transmission signal and the reception signal to the first switch 143. Therefore, when receiving the transmission signal, the first switch 143 is switched to the transmission terminal (Tx) of the position-measuring module 160 to form the transmission path between the first UWB antenna 121 and the position-measuring module 160, and when receiving the reception signal, the first switch 143 is switched to the second reception terminal (Rx2) of the position-measuring module 160 to form the reception path between the first UWB antenna 121 and the position-measuring module 160.

The position-measuring module 160 controls the second switch 144 to select the UWB antenna 120. In other words, the position-measuring module 160 transmits to the second switch 144 the control signal for forming the reception path between one of the second UWB antenna 122 and the third UWB antenna 123 and the position-measuring module 160. At this time, the position-measuring module 160 uses, as the control signal, and transmits one of the first selection signal and the second selection signal to the second switch 144. Here, the position-measuring module 160 can perform the channel impulse response (CIR) analysis or the UWB signals received from the second UWB antenna 122 and the third UWB antenna 123 and select one of the second UWB antenna 122 and the third UWB antenna 123 based on the analysis result.

Therefore, when receiving the first selection signal, the second switch 144 is switched to the second UWB antenna 122 to form the reception path between the second UWB antenna 122 and the position-measuring module 160, and when receiving the second selection signal, the second switch 144 is switched to the third UWB antenna 123 to form the reception path between the third UWB antenna 123 and the position-measuring module 160.

The position-measuring module 160 measures the position of the measurement target based on the UWB signal received from the first UWB antenna 121 and the UWB signal received from the second switch 144. The position-measuring module 160 is configured to include a UWB chipset, and measures the position of the measurement target using the method for measuring the position using the signal such as a two way ranging (TWR) or an angle of arrival (AOA) alone or in parallel.

For example, the position-measuring module 160 measures the position of the measurement target by the TWR distance measurement using the UWB signal received through the first UWB antenna 121 and the AoA direction measurement using the UWB signal of the first UWB antenna 121 and the UWB signal (i.e., the UWB signal received through the second UWB antenna 122 or the third UWB antenna 123) input through the second switch 144.

Figure 10:
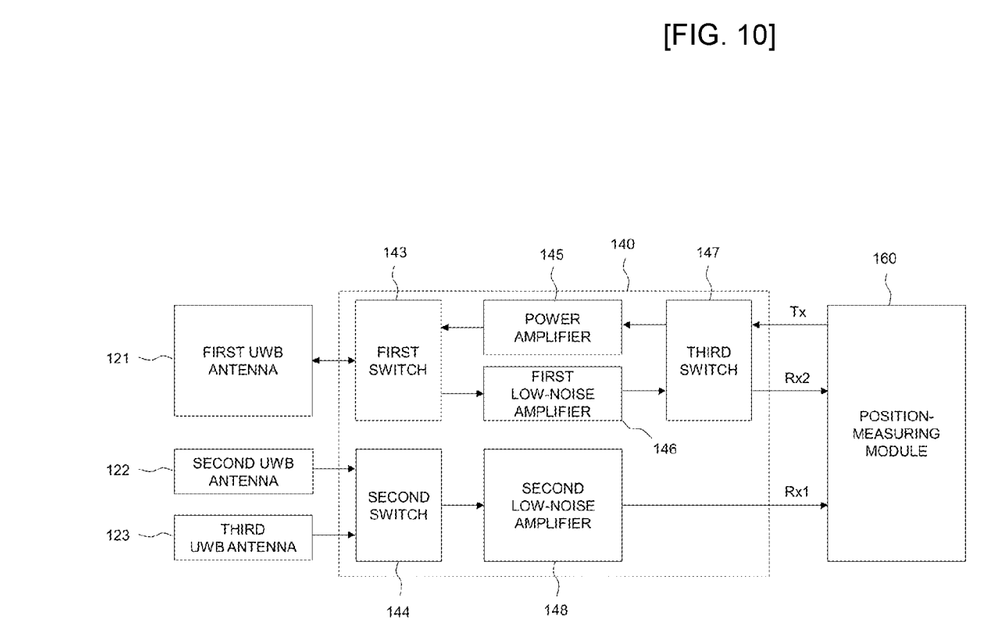
FIG. 10 is a diagram for explaining a modified example of the position-measuring device using the UWB antenna according to the second exemplary embodiment of the present disclosure.

Meanwhile, referring to FIG. 10, the position-measuring device 100 according to the exemplary embodiment of the present disclosure can also be configured to further include a power amplifier 145 positioned between the first switch 143 and the position-measuring module 160, a first low-noise amplifier 146, a third switch 147, and a second low-noise amplifier 148 positioned between the second switch 144 and the position-measuring module 160.

The power amplifier 145 amplifies the UWB signal output from the position-measuring module 160. The first low-noise amplifier 146 amplifies the UWB signal received from the first UWB antenna 121. The first switch 143 switches the first UWB antenna 121 to one of the power amplifier 145 and the first low-noise amplifier 146 in response to the control signal of the position-measuring module 160. The third switch 147 switches the first low-noise amplifier 146 to the second reception terminal (Rx2) of the position-measuring module 160 in response to the control signal of the position-measuring module 160 and switches the power amplifier 145 to the transmission terminal (Tx) of the position-measuring module 160. The second low-noise amplifier 148 amplifies the UWB signal received from one of the second UWB antenna 122 and the third UWB antenna 123 to transmit it to the second reception terminal (Rx2) of the position-measuring module 160. The second switch 144 switches one of the second UWB antenna 122 and the third UWB antenna 123 to the second low-noise amplifier 148 in response to the control signal of the position-measuring module 160.

The aforementioned preferred exemplary embodiments of the present disclosure have been described, but can be modified in various forms, and it is understood that those skilled in the art can carry out various changes and modifications without departing from the claims of the present disclosure.

The invention claimed is:

1. A position-measuring device comprising:
   a first UWB antenna configured to transmit or receive a UWB signal from a UWB tag positioned on a measurement target;
   a second UWB antenna configured to receive the UWB signal output from the UWB tag;
   a third UWB antenna configured to receive the UWB signal output from the UWB tag;
   a signal processing module configured to output the UWB signal received from the first UWB antenna and the UWB signal received from at least one of the second UWB antenna and the third UWB antenna; and
   a position-measuring module configured to measure a position of the measurement target based on the UWB signals output from the signal processing module,
   wherein the signal processing module comprises a coupler configured to combine the UWB signal received from the second UWB antenna and UWB signal received from the third UWB antenna to generate a combined UWB signal and to transmit the combined UWB signal to the position-measuring module, and
   wherein the position-measuring module measures the position of the measurement target based on the UWB signal received from the first UWB antenna and the combined UWB signal.

2. The position-measuring device of claim 1,
   wherein the position-measuring module comprises: a transmission terminal, a first reception terminal, and a second reception terminal, and
   wherein the signal processing module further comprises: a first switch configured to switch the first UWB antenna to one of the transmission terminal and the second reception terminal in response to a control signal of the position-measuring module to form one path of a transmission path and a reception path between the first UWB antenna and the position-measuring module.

3. The position-measuring device of claim 2,
   wherein when receiving a transmission signal from the position-measuring module, the first switch is switched to the transmission terminal to form the transmission path between the first UWB antenna and the position-measuring module.

4. The position-measuring device of claim 2,
   wherein when receiving a reception signal from the position-measuring module, the first switch is switched to the second reception terminal to form the reception path between the first UWB antenna and the position-measuring module.

5. The position-measuring device of claim 2,
   wherein the coupler is configured to transmit the combined UWB signal to the first reception terminal.

6. The position-measuring device of claim 2,
   wherein the signal processing module further comprises: a second switch configured to switch the first reception terminal to one of the second UWB antenna and the third UWB antenna in response to the control signal of the position-measuring module.

7. The position-measuring device of claim 1,
   wherein the signal processing module further comprises: a power amplifier configured to amplify the UWB signal output from the position-measuring module;

a first low-noise amplifier configured to amplify the UWB signal received from the first UWB antenna;

a first switch configured to switch the first UWB antenna to one of the power amplifier and the first low-noise amplifier in response to the control signal of the position-measuring module; and a third switch configured to switch the first low-noise amplifier to the second reception terminal of the position-measuring module in response to the control signal of the position-measuring module and to switch the power amplifier to the transmission terminal of the position-measuring module.

8. The position-measuring device of claim 7, wherein the signal processing module further comprises:

a second low-noise amplifier configured to amplify the UWB signal received from one of the second UWB antenna and the third UWB antenna to transmit it to the second reception terminal of the position-measuring module; and a second switch configured to switch one of the second UWB antenna and the third UWB antenna to the second low-noise amplifier in response to the control signal of the position-measuring module.

* * * * *